United States Patent [19]

Tawa

[11] 3,736,636
[45] June 5, 1973

[54] AN APPARATUS FOR ADJUSTING THE ALTITUDE OF THE CHORD OF AN EXPANDING ROLL

[75] Inventor: Kan Tawa, Takatsuki, Japan

[73] Assignee: Yamauchi Rubber Industry Co. Ltd., Hirakata-shi, Osaka, Japan

[22] Filed: June 3, 1971

[21] Appl. No.: 149,526

[30] Foreign Application Priority Data

June 5, 1970 Japan.............................45/048612

[52] U.S. Cl.............................................29/116 AD
[51] Int. Cl. ..............................................B21b 13/02
[58] Field of Search ....................29/116 AD, 116 R; 26/65

[56] References Cited

UNITED STATES PATENTS

| | | | |
|---|---|---|---|
| 2,547,975 | 4/1951 | Robertson | 29/116 R X |
| 2,960,749 | 11/1960 | Robertson et al. | 29/116 R X |
| 3,213,513 | 10/1965 | Robertson | 29/116 R X |
| 3,308,519 | 3/1967 | Westgate | 29/116 R X |
| 3,357,073 | 12/1967 | Eury | 26/63 |
| 3,376,620 | 4/1968 | Miller | 26/63 |
| 3,500,524 | 3/1960 | Jagminas | 29/116 R |

Primary Examiner—Alfred R. Guest
Attorney—Woodhams, Blanchard & Flynn

[57] ABSTRACT

An apparatus for adjusting the altitude of a chord of an expanding roll characterized in comprising: a central shaft bent in an arc-shape with the amount of its radial deflection increasing successively toward the middle thereof with respect to an imaginary straight line corresponding to the axis of an unbent central shaft; a plurality of eccentric discs or bushes rotatably fitted around said shaft and being spaced lengthwise along the axis thereof, said bushes having the eccentricities increasing successively toward the middle of said central shaft; a plurality of sleeves in which said bushes are inserted and are rotatably supported therein by means of intermediate ball bearings; a rubber roll covering said sleeves and integrated therewith to form a single rotatable unit; a plurality of coupling members, each of which penetrates through each of said bushes respectively to intercouple therewith; a bearing journaling said central shaft so as to keep said central shaft fixed thereto and, in case of need, to permit said shaft to turn round therein; and a clutch means effecting, against said bush positioned adjacent to one axial end of said central shaft, an alternate engagement with said central shaft and with said bearing.

3 Claims, 10 Drawing Figures

PATENTED JUN 5 1973

INVENTOR.
KAN TAWA
BY
Woodhams, Blanchard & Flynn
ATTORNEYS

AN APPARATUS FOR ADJUSTING THE ALTITUDE OF THE CHORD OF AN EXPANDING ROLL

BACKGROUND OF THE INVENTION

1. Field of the Invention

The present invention relates to an apparatus for adjusting the altitude of the chord of a roll for use in expanding a strip of synthetic resin film, cloth, metal foil, etc.

2. Description of the Prior Art

In the prior art, no device was provided to conduct an adjustment as above-mentioned, whereas it is needed to adjust, as required, the altitude of the chord, i.e., the deflection distance between the center line of a central shaft actually bent in an arc-shape and an imaginary straight line corresponding to the axis of an unbent central shaft.

SUMMARY OF THE INVENTION

An object of the present invention is to provide an apparatus for adjusting the altitude of the chord of an expanding roll comprising; a central shaft bent in an arc-shape; a plurality of eccentric discs or bushes fitted rotatably around said central shaft with spacing therebetween in the axial direction, said bushes having eccentricities increasing successively toward the middle of said central shaft; a plurality of sleeves in which said bushes are inserted and with intermediate ball bearings being provided therebetween; and a rubber roll covering said sleeves and integrated therewith in a unit, said rubber roll thus being disposed eccentrically relative to said central shaft.

Another object of the present invention is to provide an apparatus for adjusting the altitude of the chord of an expanding roll, wherein a central shaft is journaled at one end by a bearing so as normally to be fixed against rotation but, in case of need, being capable of rotation therein. Said central shaft is rotatable together with the bushes, relative to said bearing so as to effect deflection of said rubber roll for the purpose of adjusting the altitude of the chord thereof.

A further object of the present invention is to provide an apparatus for adjusting the altitude of the chord of an expanding roll, wherein the interconnection between said central shaft and each of bushes is cut off by means of pulling out a connecting pin which connects together the flange of a collar fixed to said central shaft and the flange of a bush disposed at the outer axial end of a line of bushes, each of said bushes being intercoupled with one another by coupling members, while the interconnection between the flange of said bush and the flange of said bearing is effected by means of a second connecting pin and thereafter said central shaft is rotated so as to result in rotation of each bush relative thereto in order to cause the deflection of a rubber roll for adjustment of the altitude of the chord, said bushes are then kept stationary along with said bearing, while said central shaft is rotated.

A still further object of the present invention is to provide an apparatus for adjusting the altitude of the chord of an expanding roll, wherein all said bushes are intercoupled with one another by coupling members, and a collar fitted around said central shaft is moved toward the bush-side by means of an operating lever in order to disengage the clutching teeth thereof from the clutching teeth of the bearing and concurrently engage the teeth, defined on the other side thereof, with the teeth of the bush, and thereafter said central shaft is rotated to effect relative rotation of each bush, which is kept stationary together with said bearing, so as to finally result in a relative displacement of a rubber roll for adjusting the altitude of the chord.

BRIEF DESCRIPTION OF THE INVENTION

Figure 1:
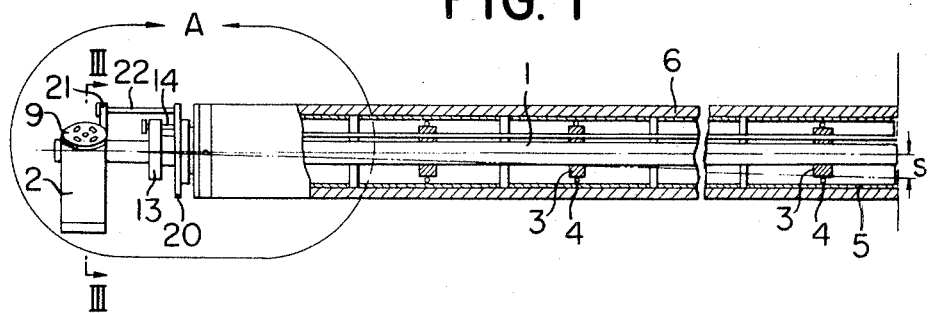
FIG. 1 is a partial longitudinal sectional view showing the left end portion of a first preferred embodiment according to the present invention.
Figure 2:
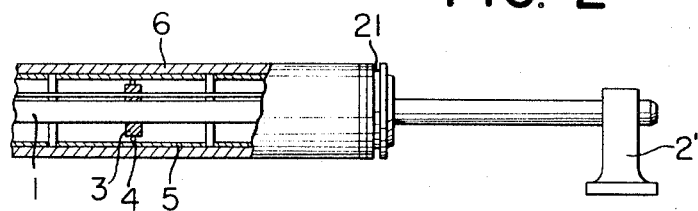
FIG. 2 is a partially longitudinal sectional view showing the right end portion of an embodiment illustrated in FIG. 1.
Figure 3:
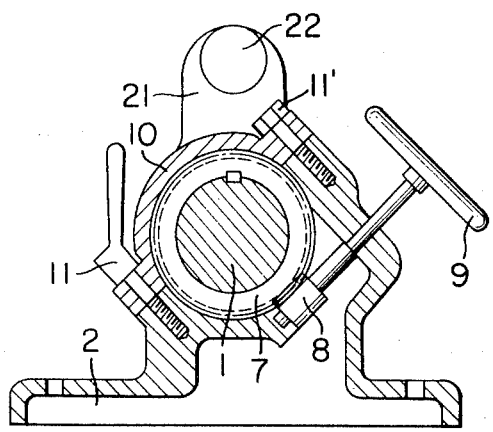
FIG. 3 is a cross-sectional view taken along the line III—III in FIG. 1.
Figure 4:
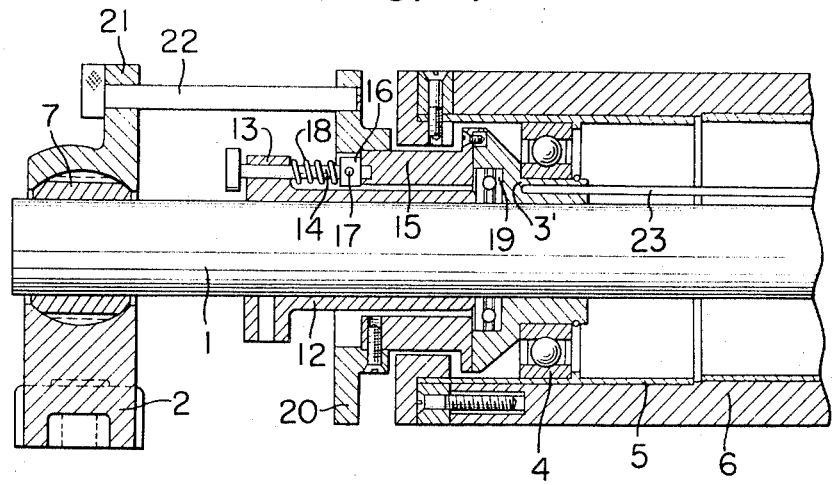

FIG. 4. is an enlarged sectional view of a portion denoted by A in FIG. 1.

Figure 5:
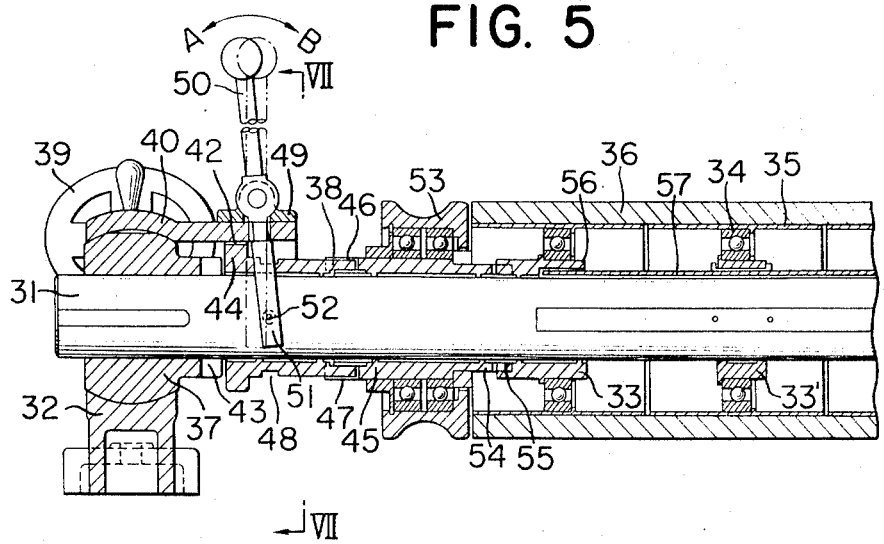

FIG. 5 is a partially longitudinal sectional view showing the left end portion of a second embodiment of the present invention.

Figure 6:
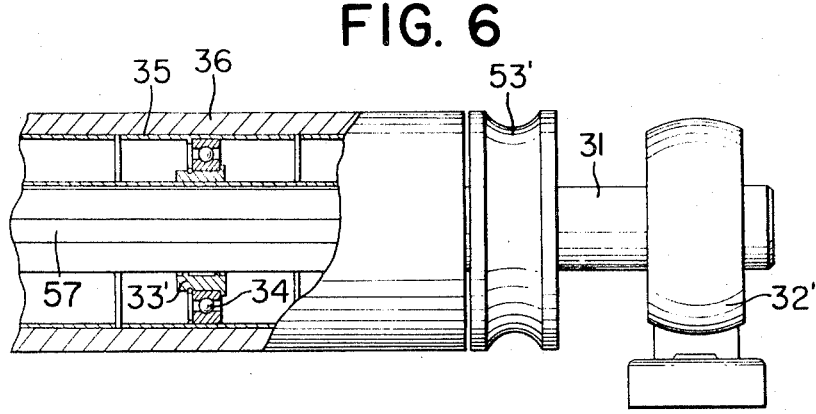

FIG. 6 is a partially longitudinal sectional view showing the right end portion of the embodiment shown in FIG. 5.

Figure 7:
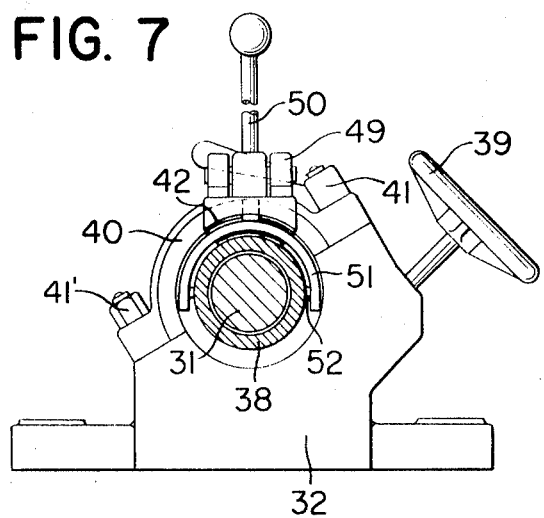

FIG. 7 is a cross-sectional view taken along the line VII—VII of FIG. 5.

FIG. 8X, 8Y and 8Z are transverse sectional views taken along a section adjacent to the middle of the central shaft for the purpose of illustrating how to adjust the altitude of the chord of a rubber roll, wherein there are shown the relative dispositions of a central shaft, an eccentric bush and a rubber roll, in the respective cases of a normal position (FIG. 8X) and the adjusted positions (FIGS. 8Y and 8Z).

DETAILED DESCRIPTION OF THE INVENTION

Now, referring to FIGS. 1 to 4, hereinunder a description will be made with respect to a first preferred embodiment of the present invention.

An apparatus for adjusting the altitude of the chord of an expanding roll comprises a central shaft 1 journaled at both its ends by bearings 2,2' and deflected in such a manner that the magnitude of its deflection increases successively toward the middle of the central shaft, the deflection being represented by s. A plurality of discs or bushes 3,3' which have eccentricities increasing successively toward the middle of the central shaft, are fitted around said central shaft. A plurality of sleeves, 5 are rotatably mounted on said bushes by means of intermediate ball bearings 4. The bearing 2 is provided with a worm gear 7 mounted at the center portion thereof. A worm 8 engages said worm gear and it is further provided with a handle 9 fixedly connected to rotate said worm about its axis.

A cover 10 of said bearing 2 is firmly secured thereto by bolts 11,11' and said cover applies a pressure against said worm gear so as to releasably fix said central shaft 1 against rotation with respect to said bearing 2.

A collar 12 is fixedly fitted around the central shaft 1 outwardly of an adjacent to said bush 3' positioned at one axial end of the line of bushes.

A first connecting pin 14 is inserted through a perforation in a flange 13 of said collar 12 and the inner end of said pin is removably inserted into one of a plurality of holes provided on the side-wall of a connecting sleeve 15 which is fixed to an positioned alongside the bush 3' at the outer end of the line of bushes.

Said connecting pin 14 is provided with, adjacent to the inner end thereof, a flange 16, on which is disposed a small checking arm 17, and a spring 18 is inserted between said flange 16 and the flange 13 of said collar.

A thrust bearing 19 is provided between the collar 12 and said bush 3' positioned at the outer end of the line of bushes. On the side of said connecting sleeve 15 facing toward the bearing 2, there is fixed a connecting disk 20, which is provided with a plurality of holes.

A second connecting pin 22 is inserted loosely through a perforation defined at the wall portion 21 of said bearing 2 and extends into one of a plurality of holes provided on said disk 20. It should be noted that each bush is intercoupled with each other by coupling members 23 which extend through openings in said bushes.

Now, referring further to FIGS. 5 to 7, the reference numeral 31 denotes a central shaft journaled by bearings 32,32', and said shaft is radially deflected with the magnitude of its deflection increasing successively toward the middle thereof. A plurality of bushes 33,33' are fitted around said central shaft, and said bushes are formed to have eccentricities which increase successively toward the middle of the central shaft.

Each of the foregoing bushes is inserted into one of a plurality of sleeves 35 respectively and is rotatably supported therein by intermediate ball bearings 34. A rubber roll 36 covers all of said sleeves 35 entirely.

A worm gear 37 is fixed to said central shaft 31 at the middle of its portion journaled by said bearing 32, and a worm engaging with said worm gear is provided within said bearing 32. A handle 39 is fixed to said worm.

Bolts 41,41' tightly fasten a cover 40 of said bearing 32 to the body thereof and thereby said cover presses said worm gear 37 toward the body of said bearing, so as to effect a fixation of the central shaft 31 in the bearing 32.

Around the central shaft there is fitted a collar 38 provided with teeth 44 at one end thereof, for alternate engagement with the teeth 42 of the cover 40 and with the teeth 43 defined on one side of said worm gear 37.

At the other end of the collar 38, there is defined the teeth 46 which are engaged with the teeth 47 provided on one side of a connecting sleeve 45 fitted around the central shaft.

An annular groove 48 is defined on the periphery of said collar 38. A change-over lever, i.e., an operating lever 50 is journaled, substantially at its middle, by a bearing 49 mounted on the cover 40 of said bearing 32.

The lower portion of said change-over lever 50 is formed into forked ends 51, and said forked ends are provided with projections 52 disposed in said groove 48.

Said connecting sleeve 45 is journaled by a bearing 53 and is provided, at its inner end, with teeth 54 to engage with the teeth 55 defined on the opposing face of the eccentric bush 33.

All of the eccentric bushes 33,33' are integratedly incorporated with one another by leaf springs 57 disposed in and through grooves defined on the inner side of said eccentric bushes.

With reference to FIG. 8X, FIG. 8Y and FIG. 8Z, a description will be made regarding how to adjust the altitude of the chord of a rubber roll in respect to the foregoing apparatus.

When it is desired to smooth away rumples, as much as possible, from a material to be expanded, the altitude L of the chord must be increased accordingly.

Figure 8:
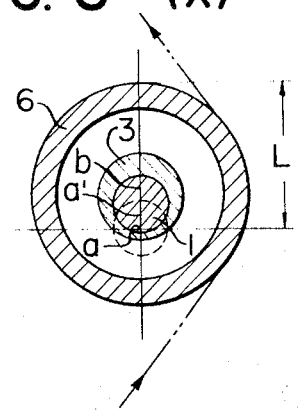
Figure 8:
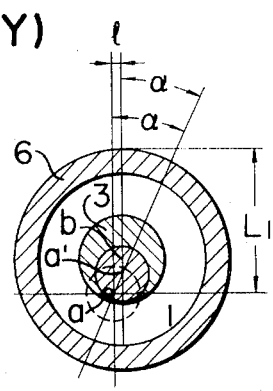
Figure 8:
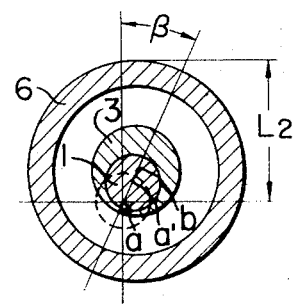

For the purpose, the roll should be set up in a normal position in order to make the altitude of the chord a maximum, as illustrated in FIG. 8 (X).

In FIG. 8X, 8Y and 8Z, there are shown the cross-sections of the rubber roll, the eccentric bush and the central shaft taken at the middle thereof, together with a broken line, corresponding to the cross-section of the imaginary position of a non-bent central shaft, i.e., as taken at the center of bearing 2.

Further, the center of the projected cross-section of the imaginary non-bent central shaft is denoted by $a$, while the center of the cross-section of the actual bent shaft at the middle is denoted by $a'$ and the center of the cross-section of the cross-section of the eccentric bush, equivalent to that of the rubber roll, is denoted by $b$.

Accordingly, if the largest altitude of the chord is required, the points of $a,a'$ and $b$ must be aligned on a perpendicular line as shown in FIG. 8 X.

On the other hand, if a decreased altitude of the chord is required, the rubber roll should be displaced to an inclined position shown in FIG. 8Y or FIG. 8Z. That is; in the former position, a segment of line $a,a'$ is inclined at an angle $\alpha$ with respect to a perpendicular line passing through point $a$ and thereby $a'$ is displaced transversely a distance $l$ from said perpendicular line and accordingly the point $b$ is displaced on a perpendicular line passing through the point $a'$, while in the latter position, the points $a'$ and $b$ are positioned on a line inclined at an angle $\beta$ with respect to a perpendicular line passing through the point $a$.

As the result, the maximum altitude L is decreased to the altitudes $L_1$ and $L_2$, respectively.

OPERATION

Now, hereinunder, a description will be made regarding how to adjust the altitude of the chord with respect to the embodiment of the present invention illustrated in FIGS. 1 to 4.

For the adjustment illustrated in FIG. 8Y, firstly the bolts 11,11' of the bearing 2 are turned backwardly to unfasten the cover 10 from the body thereof, in order to loosen the fixation of the worm gear to said bearing.

Meanwhile, the first connecting pin 14, which is inserted into the connecting sleeve 15 through the perforation provided at the flange portion 13 of a collar 12, is pulled out from sleeve 15 by overcoming the resilient force of the spring 18, and thereafter is turned so as to be checked against the wall surface of a connecting disk 20 by a checking arm 17 provided on a flange 16 of said first connecting pin 14.

Thereby, the interconnection between said collar 12 and said connecting sleeve 15, i.e., the interconnection between the central shaft 1 and said connecting sleeve 15, is broken, so that the adjustment can be achieved by rotating the handle 9 in order to rotate the worm 8 and the worm gear 7, both of which engage with each other.

Once the central shaft is rotated in such a manner as above-mentioned, a segment of line $a$–$a'$ becomes inclined to a perpendicular line passing the center $a$ and thereby the center $a'$ is moved transversely therefrom.

After the inclination of the segment of line $a$–$a'$ reaches angle $\alpha$ and the transverse movement of the center $a'$ reaches the distance $l$, the bolts 11,11' are turned reversely so as to cause the cover 10 to effect the fixation of said worm gear 7 to said bearing 2.

While the rotation of the central shaft is being conducted as above-mentioned, since the connecting disk 20 is fixedly connected with a wall portion of the bearing 2 by means of the second connecting pin 22, the connecting sleeve 15 fixed with said connecting disk 20, the external bush 3' fixed to said connecting sleeve, and all other bushes connected with said external bush 3' through the intermediate coupling members 23 which integratedly incorporate the bushes with one another, are retained without rotating together with the central shaft.

However, the center of a bush positioned near the middle of the central shaft, i.e., the center $b$ of a rubber roll 6 is also moved transversely by the distance 1 from the perpendicular line passing the center $a$. As a result, the altitude of the chord measured as L in a normal position shown in FIG. 8X is decreased to the altitude $L_1$ illustrated in FIG. 8Y.

Upon finishing the adjustment of the altitude of the chord, the first connecting pin 14 is again inserted by the force of the spring 18 into a hole provided on the side wall of said connecting sleeve 15 when it is turned back so as to release the checking arm 17 thereof from the restraint of the wall surface of the connecting disk 20 and accordingly the rubber roll 6 is maintained in its status, as it is.

Next, the description will be directed to the adjustment which is illustrated in FIG. 8Z.

The fixation of the worm gear 7 to the bearing 2 is loosened in the same way as aforementioned. Then, after releasing the second connecting pin 22 from the connecting disk 20, the central shaft 1 is rotated in the same way as described in the foregoing operation, also.

Thereby, the connecting sleeve 15, the connecting disk 20 and the bush 3', both of which are fixed to said connecting sleeve, are simultaneously rotated together with other bushes 3 incorporated integratedly to said bush 3' by means of the coupling members 23.

Accordingly, because said bushes are inserted through the intermediate ball bearings 4 into the sleeves 5 respectively and the rubber roll 6 covers all the sleeves, the center of said rubber roll 6 moves to result in an inclination of the segment of line $a-b$ with respect to a perpendicular line passing the original point of the center, that is; in this case, inclined by an angle $\beta$ in order to change the altitude of the chord from L to $L_2$.

When the adjustment is achieved in such a way, fixation of the central shaft 1 to the bearing 2 is effected by tightening the bolts 11,11' just the same as the above, and in meantime, the second connecting pin 22 is inserted into a different hole of the connecting disk 20 so that all the portions of the expanding roll are maintained without any change.

Now, the following description will be made with respect to a second preferred embodiment of the present invention shown in FIGS. 5 to 7.

Firstly, in order to achieve an adjustment illustrated in FIG. 8Y, the bolts 41 41' of the cover 40 are turned backwardly to unfasten the cover from the body of the bearing 32, so as to loosen the fixation of the worm gear 37 to the bearing. Then the change-over lever 50 is moved leftwardly in the direction A, so that the forked legs 51 are moved rightwardly so as to effect a rightward movement of said collar 38.

Thereby, the teeth 44 defined on the one end of said collar 38 disengage from the teeth 43 of said gear 37 and engage with the teeth 42 of the cover 40, while the teeth 47 provided on the other side thereof engage with the teeth 46 of the connecting sleeve 45. These matters such as above-described are visually illustrated by FIG. 5.

Thereafter, handle 39 is rotated so as to rotate the worm and worm gear 37 engaging with each other to result in rotation of the central shaft 31 which causes a segment of line $a-a'$ to be inclined by angle $\alpha$.

Meanwhile, with the collar 38 engaging the cover 40, the connecting sleeve 45, bushes 33,33', sleeves 35 and the rubber roll 36, all of which are interconnected are maintained stationary, but the center $b$ is moved transversely by $l$ and thereby the altitude of the chord is changed from the original L to $L_1$.

Upon finishing the adjusting operation in such a manner, the bolts 41 41' are fastened again to the cover 40, so as to effect the fixation of the worm gear 37 to the bearing 32.

Next, in order to achieve the adjustment illustrated in FIG. 8Z, the fixation of the worm gear to the bearing 32 is released in the same manner as in case of FIG. 8Y, and thereafter the change-over lever 50 is moved rightwardly, i,e., in the direction B, contrary to the previous case.

Thereby the forked legs 51 are moved leftwardly to effect the leftward movement of the collar 38 also, which causes the teeth 44 on one end thereof to disengage from the teeth 42 of the cover and, at the same time, causes the same to engage with the teeth 43 of the worm gear 7. Meanwhile, the teeth 47 on the other end of said collar are also moved leftwardly within the teeth 46 of the connecting sleeve 45; but not be moved enough to be disengaged therefrom.

Then the worm and worm gear 37 are rotated by the handle 39. Accordingly, the central shaft 31, the collar 38, the connecting sleeve 45, the eccentric bushes 33,33', sleeves 35 and the rubber roll 36 are rotated simultaneously and integratedly and thereby the center of the rubber roll $b$ is moved, so as the segment of line $a-b$ gets inclined by angle $\beta$ with respect to the perpendicular line passing the original center.

Thus, the altitude of the chord is altered from L to $L_2$.

After finishing the adjusting operation thereof in such a way, the fixation of the central shaft to the bearing 32 should be again effected in the same manner as aforementioned.

In addition, it should be understood that the above descriptions have been made strictly for the construction and operation with regard only to the preferred embodiments of this invention.

What is claimed is:

1. An expanding roll construction, comprising:
    an elongated longitudinally curved central shaft whose radial deflection, with respect to an imaginary straight line corresponding to the longitudinal axis of a non-curved central shaft, increases toward the longitudinal midpoint thereof;
    a plurality of discs eccentrically mounted on said central shaft for rotation with respect thereto, said discs being spaced apart lengthwise along said central shaft and having eccentricities which increase successively toward the longitudinal midpoint of said central shaft;

a plurality of sleeves rotatably supported on said discs so that said sleeves can rotate with respect to said discs;

a rubber roll covering said sleeves and integrated therewith to form a single rotatable unit;

coupling members connecting said discs for conjoint rotation with respect to said central shaft;

journal means journaling said central shaft for rotation about said axis;

releasable means for normally holding said central shaft against rotation about said axis, said releasable means, when released, permitting rotation of said central shaft;

and connecting means for selectively releasably drivingly connecting the disc at one axial end of said central shaft with (1) said central shaft, or (2) said journal means, so that the discs can be rotated with said central shaft or can be held against rotation while said central shaft rotates.

2. An expanding roll construction according to claim 1, wherein said connecting means comprises a collar fixed to said central shaft, a connecting member fixed to said disc at one axial end of said central shaft, a flange fixed to said journal means, a first connecting pin for releasably connecting said collar to said connecting member and a second connecting pin for releasably connecting said flange to said connecting member.

3. An expanding roll construction according to claim 1, wherein said connecting means comprises a collar slidably mounted on said shaft between said journal means and said disc at one axial end of said central shaft, said collar having two sets of clutch teeth at opposite axial ends thereof, said disc having a third set of clutch teeth clutched to the set of clutch teeth on the adjacent end of said collar, said central shaft having a fourth set of clutch teeth and said journal means having a fifth set of clutch teeth, said fourth and fifth sets of clutch teeth being alternatively clutchable to said set of clutch teeth at the other end of said collar, and an operating level pivotally mounted on said journal means and connected to said collar for moving said collar between positions in which said fourth and fifth sets of clutch teeth are respectively clutched to the set of clutch teeth at the other end of said collar.

* * * * *